May 25, 1954

H. LOCHER

METHOD AND APPARATUS FOR DETERMINING
THE MEAN DEVIATION OF A VARIABLE
MAGNITUDE FROM ITS AVERAGE VALUE

Filed March 10, 1950

INVENTOR.
Hans Locher
BY
ATTORNEY

May 25, 1954
H. LOCHER
2,679,639
METHOD AND APPARATUS FOR DETERMINING
THE MEAN DEVIATION OF A VARIABLE
MAGNITUDE FROM ITS AVERAGE VALUE
Filed March 10, 1950
2 Sheets-Sheet 2
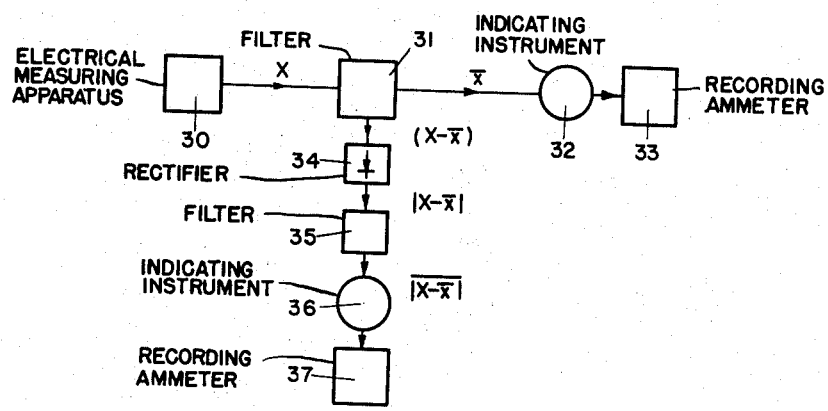
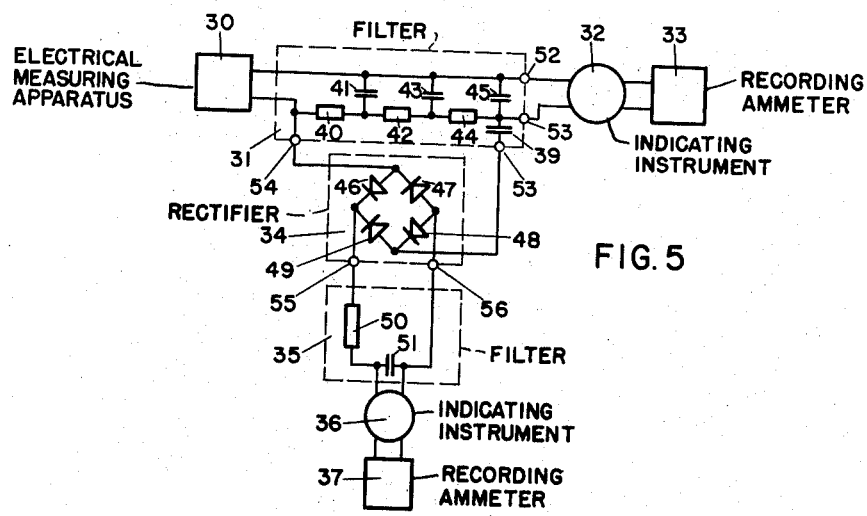
INVENTOR.
Hans Locher
BY
ATTORNEY Patented May 25, 1954

2,679,639

UNITED STATES PATENT OFFICE 2,679,639

METHOD AND APPARATUS FOR DETERMINING THE MEAN DEVIATION OF A VARIABLE MAGNITUDE FROM ITS AVERAGE VALUE

Hans Locher, Uster, Switzerland, assignor to Zellweger A. G., Apparate und Maschienfabriken Uster, Uster, Switzerland Application March 10, 1950, Serial No. 148,998

5 Claims. (Cl. 340—213)

This invention relates to a method and apparatus for determining the mean deviation of a variable magnitude from its average value and more particularly to a method and apparatus for determining the mean deviation of the quantity of substance in the cross-section of fibre slivers, rovings and yarns.

Textile technique is already acquainted with a large number of mechanical, and in recent times also electrical methods (cf. Swiss Patent No. 249,096) for measuring and recording the unevenness of the quantity of substance in the cross-section of fibre slivers, rovings and yarns produced in the textile industry.

In the case of the electrical methods of measuring, by means of the quantity of substance in the cross-section of the tested material moved through and measuring system at a constant speed, an electrical value is obtained whose magnitude serves as a measure for the quantity of substance in the cross-section of the tested material. By continuous graphic recording of this value a picture of the fluctuations in cross-section of the tested material is obtained.

There also exists apparatus which at regular intervals determines the cross-section of the tested material at certain places only.

From the character of the drawn diagrams numerous conclusions may be deduced, for instance with respect to the manner of working of a spinning frame when mechanically adjusted in various ways or when operated at various speeds, as well as with respect to the influence of the doubling figure and degree of draft on the unevenness of the textile product. These conclusions may be drawn subjectively, based on marked periodic or aperiodic runs of the diagram, on the absolute width within which the diagram varies, or on some other deviating features that strike one when the diagrams are compared.

It is, however, very often necessary to compare objectively with each other the unevenness of two yarns, rovings or slivers, whose difference in unevenness is but slight. Further, in textile measuring tecehnique it is necessary to undertake a standardizing of the mean unevenness, in order to fix the limiting values for good, medium and poor qualities. In such a case, judging by the eye alone is generally no longer sufficient; objective methods of evaluation must be adopted. With the help of a planimeter it is possible, according to known methods, to determine from the diagram the mean linear deviation as a percentage. But the evaluating of diagrams with the planimeter is a work demanding much time and great concentration.

The mean linear deviation may also be determined mathematically in known manner by obtaining the average of individual values, these individual values being taken from the diagram of the quantity of substance in the cross-section at places situated at equal distances apart from each other.

Since the determining of the average value entails much work in adding, the mathematical method takes in most cases still more time than evaluation with the planimeter.

The chief object of the present invention is to eliminate the drawbacks of the methods of evaluation above described.

An object of the present invention is to provide a method for determining the mean deviation of a variable magnitude from its average value.

A further object is to provide apparatus for determining the mean deviation of a variable magnitude from its average value. Other objects of the invention will be readily preceived from the following description.

This invention relates to a method for determining the mean deviation of a variable magnitude from its average value in which the steps consist in obtaining an equivalent electrical magnitude from the variable magnitude, separating the average value of the electrical magnitude so obtained from its deviations from the average value, then rectifying the deviations, averaging the deviations and measuring the average of the deviations.

This invention further relates to apparatus for determining the mean deviation of a variable magnitude from its average value which comprises means for obtaining an electrical magnitude from a variable magnitude and separating the equivalent electrical magnitude into its average value and its deviations from the average value, a rectifier for rectifying the electrical magnitude which represents the deviations and is variable in time, means for obtaining the average value of the rectified magnitude, and an instrument for indicating said average value.

The attached drawings illustrate a preferred embodiment of the invention, in which Figure 1 is a diagrammatic view of a graph which serves to explain the principle of determining the mean deviation;

Figure 4 is a diagrammatic view of the apparatus of the invention; and

Figure 5 is a diagrammatic view of the wiring circuit of the apparatus shown in Figure 4.

Figure 1:
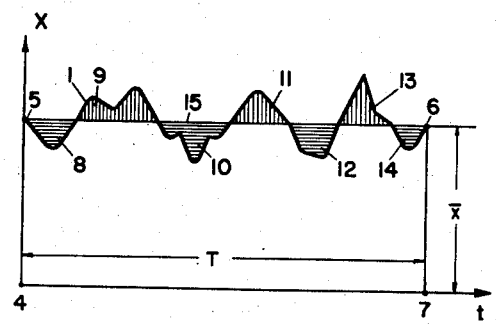

Referring to the drawings, in Figure 1, the curve 1 shows the value of an electrical measured magnitude $x$ as a function of the time $t$. The curve runs from the point 5 to the point 6. The mean value $\bar{x}$ of the electrical measured magnitude $x$ is represented by the line 15. Above the average-line 15 are to be found the areas 9, 11 and 13 bounded on the one hand by the curve 1 and on the other hand by the average-line 15, and below the average-line the corresponding areas 8, 10, 12 and 14.

Calculation of the mean linear deviation is based on the following, generally used mathematical formula:

$$(1) \quad \alpha = \frac{1}{T}\int_0^T |(x-\bar{x})|dt$$

where $$(2) \quad \bar{x} = \frac{1}{T}\int_0^T x\,dt$$

In these formulae:

$\alpha$ = the mean linear deviation,
$T$ = time during which the recorded measuring was evaluated (corresponds to the length of the diagram-strip), $\int_0^T$ = Integral sign, $x$ = electrical measured magnitude, which is a function of the time,
$\bar{x}$ = average value of the measured magnitude,
$dt$ = differential with respect to the time $t$.

The evaluating of the diagram according to this formula is generally effected by employing a planimeter, the measuring being done in two operations: The area F, determined by first tracing round 4—5—curve of the measured magnitude—6—7—4, divided by the length T, gives the average value $\bar{x}$ of the measured magnitude $x$. This value is entered in the diagram as line 15. After that, the sum $f$ of the areas of the horizontally and also of the vertically shaded surfaces 8 to 14 is determined, and the total area $f$ thus obtained is divided by the whole area F. In this way we obtain the mean linear deviation $\alpha$.

$$(3) \quad \alpha \text{ (in per cent)} = \frac{f}{F} \cdot 100$$

The mean linear deviation may also be obtained by mathematical treatment of individual values. The formula for the linear deviation determined from individual values is:

$$(1)' \quad \alpha = \frac{1}{N}\int_{i=1}^N |(x_i-\bar{x})|$$

where $$(2)' \quad \bar{x} = \frac{1}{N}\int_{i=1}^N x_i$$

In these formulae:

$\alpha$ = the mean linear deviation,
$N$ = number of measured values taken into account in the calculation, $\int^N$ = sum of N values of $|(x_i-\bar{x})|$ respectively $x_i$ $x_i$ = momentary value of the electrical measured magnitude, measured at equally large intervals of time,
$\bar{x}$ = average value of the momentary values.

The mean quadratic deviation is generally determined by the mathematical treatment of individual values. These values may be determined either as individual measured values, or even be taken at regular intervals from the continuous diagram.

In Fig. 4, the reference numeral 30 signifies an electrical measuring apparatus which obtains an equivalent electrical measured magnitude $x$ from a variable magnitude of a tested material, of which measured magnitude $x$ the average value of the absolute values of the deviations $|x-\bar{x}|$ from the average value $\bar{x}$ is to be determined. The tested material may be a textile material, particularly slivers, yarns and rovings. The electrical measuring apparatus 30 is shown in the patent to Grob et al., Re. 23,368. It is understood that other means may be employed to obtain the desired electric signal. The measured magnitude $x$ is led to an electrical frequency-dependent filter 31. A first indicating instrument 32 is used to indicate the magnitude proportional to the average-value magnitude $\bar{x}$ and arising at an outlet of the electrical frequency-dependent filter 31. Preferably this measured magnitude $\bar{x}$ is recorded by a recording ammeter 33.

The measured magnitude arising at the other outlet of the frequency-dependent electrical filter 31 is proportional to $(x-\bar{x})$ and passes to the rectifier 34, through which this measured magnitude $(x-\bar{x})$ with positive and negative values is rectified. In the example of execution this rectifying takes place linearly; it could, however, take place quadratically or according to any arbitrarily chosen characteristic. At the outlet of the rectifier, a magnitude proportional to $|x-\bar{x}|^n$ arises, $n$ being dependent on the characteristic of the rectifier.

Figure 2:
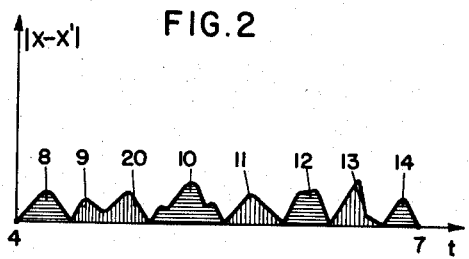
Figure 2 is a diagrammatic view of a graph which serves to illustrate the measured magnitude of the deviations arising after rectification.

In Fig. 2 there is illustrated, as a function of the time $t$, the measured magnitude $|x-\bar{x}|$ arising after rectifying at the rectifier 34. The curve 20 illustrates the deviations of the electrical measured magnitude $x$ from its average value $\bar{x}$, the curve sections lying higher than the average-line 15 and the curve sections lying lower than the average-line 15 now appearing with the same sign. The rectified measured magnitude $|x-\bar{x}|$ is not directly recorded, but is passed to a second frequency-dependent filter 35. This forms the average value $\overline{|x-\bar{x}|}$, since in practice an average value of the absolute values of the deviations $|x-\bar{x}|$ over a certain time is more suitable than the recording of $|x-\bar{x}|$.

Figure 3:
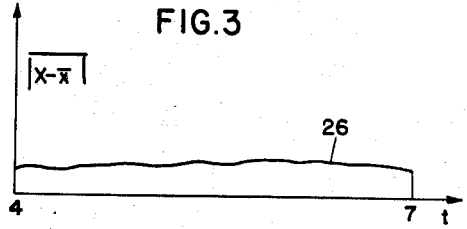
Figure 3 is a diagrammatic view of a graph which shows the run of the average value of the deviations obtained as a function of the time.

In Fig. 3 there is shown the run of this average value in the curve 26, as is obtained as a function of the time $t$ at the outlet of filter 35. The average value of the deviations is indicated by a second indicating instrument 36 and can be recorded by a second recording ammeter 37.

The instruments 36 and 37, which indicate and record the average value 26 of the deviations, are with advantage calibrated in such a way that the average deviation can be read direct as a percentage.

In Fig. 5 the numeral 30 signifies an electrical measuring apparatus, which obtains from a variable magnitude of a tested material an equivalent electrical measured magnitude $x$, whose mean deviation from the average value $\bar{x}$ are to be determined.

The electrical measured magnitude, which may for instance have the run of the curve 1 in Fig. 1, passes to an electrical frequency-dependent filter 31. This is for example represented with three arms, and consists of the series resistances 40, 42 and 44 and the shunting condensers 41, 43 and 45. The series resistances 40, 42 and 44 may also be replaced by induction coils. The wiring acts as low-pass filter, so that the relatively rapid fluctuations of the magnitude $x(t)$ cannot reach the outlet terminals 52, 53. At these terminals practically only the average value $\bar{x}$ appears. At the resistances 40, 42 and 44 arranged in series, and therefore at the terminals 53, 54, there is on the other hand only an alternating magnitude corresponding to the deviations $(x-\bar{x})$ of the measured magnitude $x$ from its average value $\bar{x}$, since the average value $\bar{x}$ itself cannot pass the condensers 39 and 45. The alternating voltage arising at the terminals 53, 54 has therefore positive and negative momentary values, the positive momentary values corresponding to the positive deviations and the negative momentary values corresponding to the negative deviations of the measured magnitude $x$ from its average value $\bar{x}$. This alternating voltage corresponding to the deviations $(x-\bar{x})$ of the measured magnitude $x$ passes to a rectifier 34. This consists, for example, of the rectifier elements 46, 47, 48 and 49, which are arranged according to the known full wave rectifier. At the outlet terminals 55, 56 of the rectifier 31, a voltage proportional to $|x-\bar{x}|$ arises.

In order to obtain an average value from these deviations $|x-\bar{x}|$ a second frequency-dependent electrical filter 35 is employed, which for example may consist of a resistance 50 and of a condenser 51. At the condenser 51 a voltage then arises which corresponds to the average value of the magnitude $|x-\bar{x}|$. In the following indicating instrument 36 this average value $\overline{|x-\bar{x}|}$ is indicated. It may in addition be recorded in a recording ammeter. It would also be possible to employ a recording ammeter which records the quadratic average value (effective value) $(\overline{|x-\bar{x}|^2})^{1/2}$ of the fluctuating squares $|x-\bar{x}|^2$.

As already mentioned, the frequency-dependent electrical filter 31 is chosen of such electrical dimensions that it allows only very slow fluctuations (for instance, fluctuations with a frequency 1/60 C. P. S.) of the average value $\bar{x}$ of the measured magnitude $x$ to pass through at its outlet terminals 52, 53. In this case, at the indicating instrument 32 which indicates the average value $\bar{x}$ of the measured magnitude $x$, there is a practically constant indicated value $\bar{x}$.

When using the appliance according to the invention with measuring apparatus which gives a measured magnitude $x$ corresponding to the quantity of substance in the cross-section of sliver, rovings and yarns, it is preferable to choose the frequency-dependent electrical filter 31 of such dimensions that only fluctuations of the average value $\bar{x}$ are indicated which correspond to a length of tested material of at least 8 metres.

The frequency-dependent electrical filter 35, which obtains the average value $\overline{|x-\bar{x}|}$ from the deviations $|x-\bar{x}|$ of the measured magnitude $x$ from its average value $\bar{x}$, is also with advantage chosen of such dimensions that only fluctuations of the average value 26 of the deviations are indicated which correspond to a length of tested material of at least 8 metres.

It is clear that, for other fields of application, the electrical filters 31 and 35 must preferably be dimensioned for other limiting frequencies.

While I have described a preferred embodiment of my invention, it will be understood my invention is not limited thereto since it may be otherwise embodied within the scope of the following claims.

I claim:

1. Apparatus for determining the mean deviation of a variable magnitude from its average value which comprises means for obtaining an equivalent electrical magnitude from a variable magnitude, a frequency-dependent electrical filter for separating said equivalent electrical magnitude into its average value and its deviations from the average value, an electrical instrument for indicating the average value, a rectifier for rectifying the electrical magnitude which represents the deviations, a second frequency-dependent filter for obtaining the average value of the rectified magnitude which represents the deviation, and an electrical instrument for indicating said average value of the rectified magnitude which represents the deviations.

2. Apparatus according to claim 1 in which a rectifier having a linear characteristic is employed for rectifying both the positive and negative deviations of the electrical magnitude from its average value.

3. Apparatus according to claim 1 in which a rectifier having a quadratic characteristic is employed for rectifying both the positive and the negative deviations of the electrical magnitude from its average value.

4. Apparatus for determining the mean deviation of a variable magnitude from its average value which comprises means for obtaining an equivalent electrical magnitude from a variable magnitude, a frequency-dependent electrical filter for separating said equivalent electrical magnitude into its average value and its deviations from the average value, said filter being so selected that, with the adopted test speed, only fluctuations of the average value of the measured magnitude are indicated which correspond to a length of tested material of at least eight metres, an electrical instrument for indicating the average value, a rectifier for rectifying the electrical magnitude which represents the deviations, a second frequency-dependent filter for obtaining the average value of the magnitude which represents the deviations, and an electrical instrument for indicating said average value of the rectified magnitude which represents the deviations.

5. Apparatus for determining the mean deviation of a variable magnitude from its average value which comprises means for obtaining an equivalent electrical magnitude from a variable magnitude, a frequency dependent electrical filter for separating said equivalent electrical magnitude into its average value and its deviations from the average value, an electrical instrument for indicating the average value, a rectifier for rectifying the electrical magnitude which represents the deviations, a second frequency dependent filter for obtaining the average value of the rectified magnitude which represents the deviations, said second filter being so selected that with the adopted test speed only fluctuations of the average value of the deviations of the measured magnitude from its average value are indicated, which correspond to a length of tested material of at least eight metres, and an electrical instrument for indicating said average value of the rectified magnitude which represents the deviations.

References Cited in the file of this patent

UNITED STATES PATENTS

| Number | Name | Date |
|---|---|---|
| 2,101,260 | Luhn | Dec. 7, 1937 |
| 2,139,474 | Shepard | Dec. 6, 1938 |
| 2,477,395 | Sunstein | July 26, 1949 |
| 2,534,005 | De Boisblanc | Dec. 12, 1950 |
| 2,605,332 | Parsons | July 29, 1952 |

FOREIGN PATENTS

| Number | Country | Date |
|---|---|---|
| 249,096 | Switzerland | Mar. 16, 1948 |